United States Patent
Roach

[11] Patent Number: 5,992,467
[45] Date of Patent: Nov. 30, 1999

[54] LINER REDUCTION SYSTEM USING PRESSURIZED DIES AND APPARATUS THEREFOR

[76] Inventor: Max Jerry Roach, 27286 Jimmy La., Conroe, Tex. 77385

[21] Appl. No.: 08/781,893

[22] Filed: Dec. 30, 1996

[51] Int. Cl.[6] .......................... F16L 55/165; B29C 70/50
[52] U.S. Cl. .................. 138/98; 138/146; 264/36.16; 264/209.4; 264/294; 264/566; 264/569
[58] Field of Search ................ 138/97, 98, 146; 264/294, 209.4, 566, 569, 36.16, 36.17, 269

[56] References Cited

U.S. PATENT DOCUMENTS

| | | | |
|---|---|---|---|
| 3,668,288 | 6/1972 | Takhashi | 264/209.4 |
| 3,856,905 | 12/1974 | Dawson | 138/98 |
| 4,028,037 | 6/1977 | Dawson | 425/392 |
| 4,181,487 | 1/1980 | Kessler | 264/209.4 |
| 4,543,051 | 9/1985 | Maillefer | 264/566 |
| 4,626,183 | 12/1986 | Shirai et al. | 264/566 |
| 4,818,314 | 4/1989 | Brittain et al. | 156/87 |
| 4,923,663 | 5/1990 | McMillan | 264/269 |
| 4,985,196 | 1/1991 | LeDoux et al. | 138/97 |
| 4,997,613 | 3/1991 | McMillan | 264/269 |
| 5,026,447 | 6/1991 | O'Connor | 264/294 |
| 5,028,376 | 7/1991 | Vanderwoude | 264/209.4 |
| 5,048,174 | 9/1991 | McGuire | 29/451 |
| 5,167,056 | 12/1992 | McGuire | 29/234 |
| 5,214,835 | 6/1993 | McGuire | 29/451 |
| 5,306,449 | 4/1994 | Brittain et al. | 264/36 |
| 5,445,001 | 8/1995 | Snavely | 72/55 |
| 5,481,892 | 1/1996 | Roper et al. | 72/61 |
| 5,626,801 | 5/1997 | McMillan et al. | 138/97 |
| 5,645,784 | 7/1997 | McMillan et al. | 264/229 |
| 5,839,475 | 11/1998 | Maine et al. | 138/97 |

FOREIGN PATENT DOCUMENTS 2084686   4/1982   United Kingdom .

*Primary Examiner*—James F. Hook
*Attorney, Agent, or Firm*—Gunn & Associates, P.C.

[57] ABSTRACT

This application discloses a liner pipe reduction system comprising at least one pressurized die and at least one pressure cell. The pressurized dies and pressure cell are interconnected to form a reduction system to reduce the friction of liner pipe as it passes through one or more dies.

17 Claims, 2 Drawing Sheets

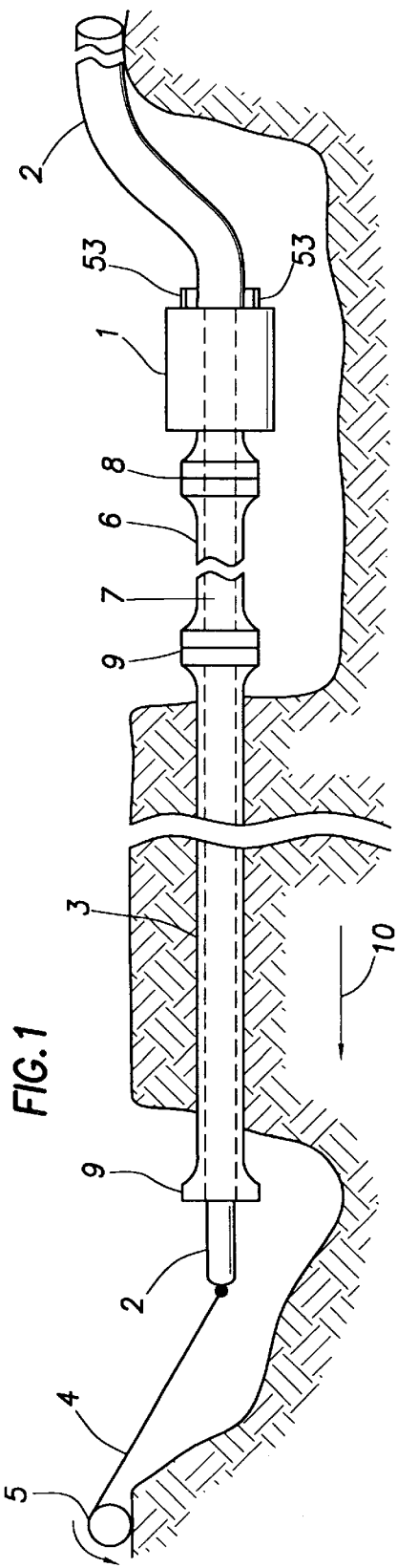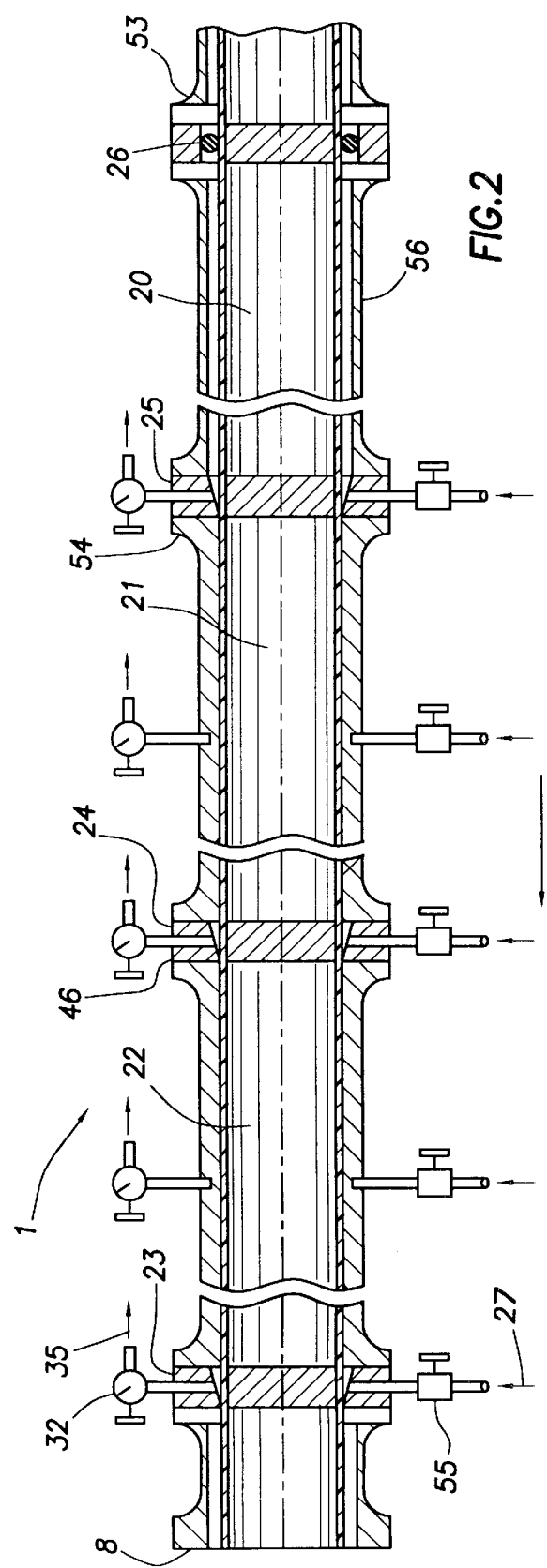

LINER REDUCTION SYSTEM USING PRESSURIZED DIES AND APPARATUS THEREFOR

BACKGROUND OF THE INVENTION

This invention relates to the pipeline industry where steel pipe is lined with a thermoplastic liner (such as, but not limited to, polyethylene, nylon and other polyolefins) to prevent internal corrosion, and in some cases (Roach, U.S. Pat. No. 115,072,622 dated Dec. 17, 1991) the liner is used to monitor the integrity of the steel host pipe.

There are basically two types of liners that are presently installed: (A) tight-fitting liners, where the outside diameter of the liner is installed insitu against the inside diameter of the host pipe, and (B) loose-fitting liners, which are installed with a space between the inside diameter of the host pipe and the outside diameter of the liner. After installation, the internal working pressure of the host pipe, heat, and/or other methods cause the liner to expand against the inside diameter of the host pipe; for example, steel line pipe used in the pipe line industry to transport refined liquids and natural gas over long distances.

This Pressurized Dies invention specifically addresses the method of reducing a liner that has an outside diameter which is approximately 5% larger than the inside diameter of the host pipe so it can be installed insitu. The liner, after being reduced and installed, will increase in diameter spontaneously, without the aid of (A) heat, (B) internal pressure of the host pipe, (C) reforming a liner that has been extruded in shapes smaller than the host pipe's inside diameter, or (D) other methods.

The basic technology of installing liners "against the wall" involves (1) the reduction of a plastic liner, not exceeding its elastic limits in the axial direction and pulling the liner into the host pipe, and (2) not exceeding the plastic liner's elastic limits in the longitudinal direction. After the plastic liner is installed, it is allowed, over time, to relax and expand to its original size. However, the plastic liner will be prevented from expanding to its original size, and will instead press against the inside diameter of the host pipe; therefor resulting in an interference fit and remain tight against the host pipe's inside diameter.

As the host pipes become larger in diameter (12" plus), or a particular construction job involves several different sizes of liners, it becomes very expensive to build reduction machines that may, for example, involve roller reduction machines, as each size requires a specially-made set of rollers. These increased costs are normally passed on to the client.

In the case of the technologies using reduction dies, with or without heat, etc., there exists a major problem of the liner being over-stressed and exceeding their elastic limits in the longitudinal direction due to the friction, or drag, as they are pulled through the dies.

The Pressurized Dies invention will allow the liner pipe to pass through the reducing dies with less friction and drag. This further allows the liner pipe to be pulled into the host pipe and requires less connections between "pulls". Fewer connections and longer "pulls" result in less cost to the contractor and the client. Consequently, the Pressurized Dies invention is a more cost-effective system than other systems known to the art.

To change the size of the dies is inexpensive, as compared to "roller" alternatives and other systems. This also translates into reduced costs to the client, as it is expensive to dig out the existing pipelines in short lengths to install short "pulls" of liners.

The Pressurized Die invention is novel in its approach to liner reduction and is cost effective to the client as related to utility.

PRIOR ART

1) Patent to British Steel, No. GB-2-084-686-A, disclosed a method of using rollers and heat to expand the liner against the host pipe's inside diameter.

2) Leduc U.S. Pat. No. 4,863,365, discloses a method of deforming a plastic liner and using heat to reform the liner after installation.

3) McMillan U.S. Pat. No. 4,923,663, uses a crushing machine to reduce the liner prior to insertion into the host pipe.

4) Pope and Lott U.S. Pat. No. 3,462,825 (1969), disclosed the use of dies to reduce the liner pipe prior to insertion without the use of heat to expand the liner after installation.

5) Dawson U.S. Pat. No. 3,939,243 (1976), discloses a method of using moving dies to obtain reduction.

6) Canadian Patent to Whyman and Kneller, No. 1,241,262, discloses how to install an oversized liner by using rollers.

Each of the referenced patents addresses the technology of liner reduction, but fails to address the reduction in tension and drag as the liner pipe travels through the reduction dies. The Pressurized Die invention is presented for patent application as it will reduce the friction of a die, and allow larger liner pipes to be installed between flanges and further reduce the labor and materials required to cut into an existing buried pipeline to install extra flanges, as required by the existing technologies and patents.

The use of non-pressurized dies as a means of reduction is known to the art and is not made a part of pressurized die invention.

SUMMARY OF THE INVENTION

The Pressurized Die invention is a method of reducing the friction of the liner pipe as it is reduced by one or more dies. This is accomplished by using a lubricious liquid, under pressure, between the dies. Prior to entering the pressurized die, the liner will be in a pressure mode just above the liner's collapse pressure, and the force of the pressure will tend to reduce the outside diameter. The liquid (or gas) injected under pressure into a pressure cell created between a "lip seal" and a die, or a pressure cell located between two dies, will adhere to the surface of the liner pipe and reduce the friction as the liner passes through the die(s). Within the reduction radius of the reduction dies there is a reduction area which is placed within the reduction radius to re-lubricate the die. This is necessary as the liner will tend to wipe off the lubricant as it is depressed and the die is heated from the continuous friction of the liner passing through the die, further causing the lubricant entering the front of the pressure cavity to "flash" and the die to become dry. It is envisioned that liner pipe, larger than 12", can be pulled through the host pipe in continuous lengths of approximately one mile between flanges. Preliminary tests on smaller liner pipes shows a friction (drag) reduction of more than 25%, as compared to non-pressurized dies.

The economics of changing die sizes will be cost-effective, especially on larger size installations where more than one size liner pipe is specified by the client.

The fluid lubricant (or gas) injected into the die or the pressure cell created by a lip seal and die or between pressurized dies will vary with the need to increase or decrease friction during the insertion. The percent of slick matrix is varied by the valving system from the supply source of the liquid or gas injected into the pressurized die reduction system. Pressure cells plus the pressurized dies are a part of the "system".

During the initial stages of the liner being pulled through the dies, maximum friction ("hold-back") must be achieved to create tension between the pulling head fused to the liner pipe and the pulling winch. This tension keeps the liner pipe from expanding while it is being installed. As the liner is pulled through the pipeline, the overall friction at the winch increases due to the resistance of the dies and the resistance of the liner being pulled along the bottom of the pipeline. The friction of the liner being pulled through the pipe cannot be easily corrected by standard die reduction systems known to the art, but the increase or decrease of friction as the liner passes through the pressurized die can be varied by reducing the amount of water, for example, and increasing the amount of lubricants or gases, which are being injected into the pressure cells and dies.

DESCRIPTION OF THE DRAWINGS

FIG. 1 is a cross-sectional view of a typical liner pipe installation using pressurized dies.

FIG. 2 is a cross-sectional view of the pressurized die system showing how pressure is used to increase or decrease the tension or drag on the liner pipe as it is reduced in size as it passes through the pressure cell(s) and pressurized die(s) system.

DESCRIPTION OF THE PREFERRED EMBODIMENTS

Figure 3:
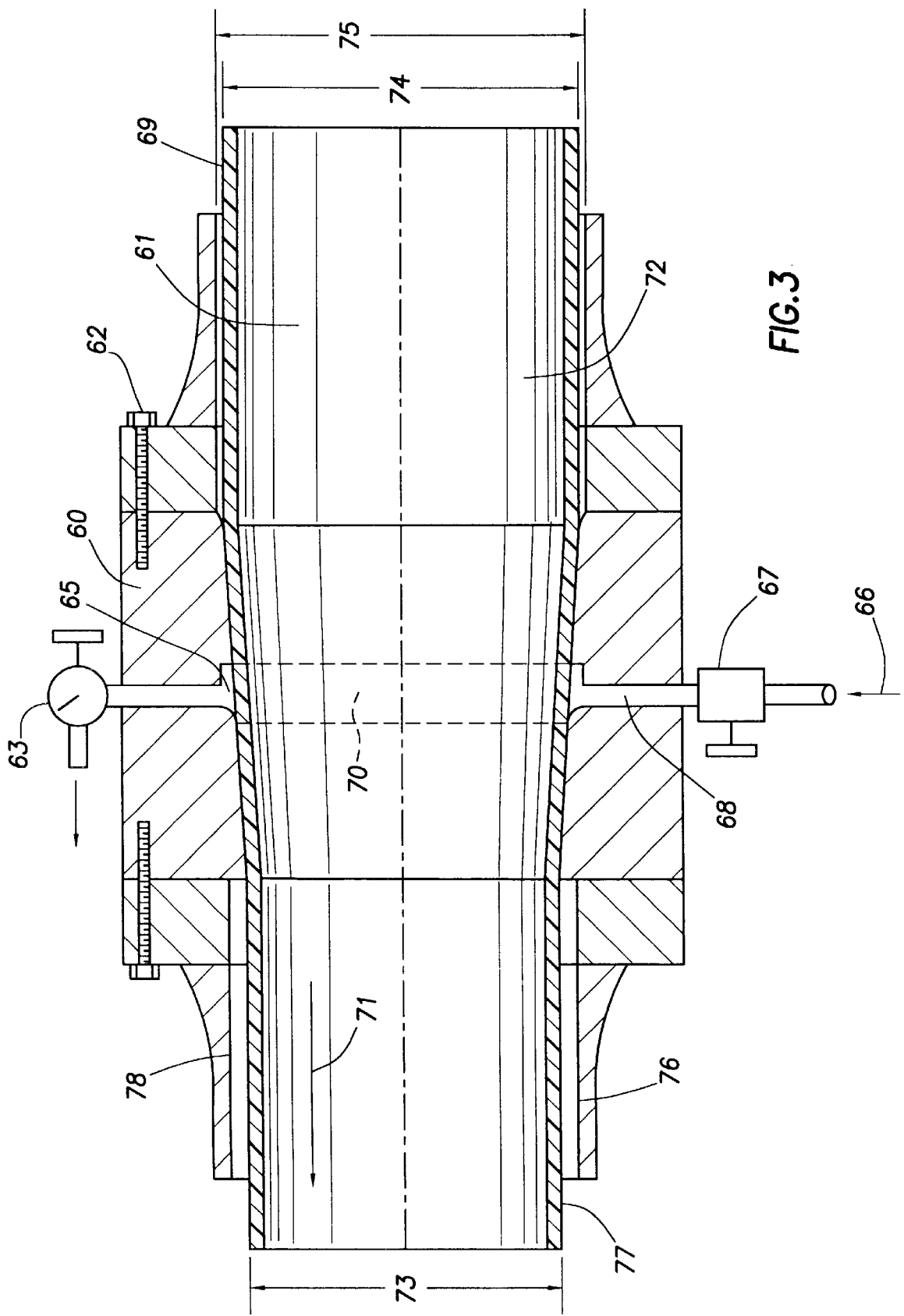
FIG. 3 is a cross-sectional view of a pressurized die showing the details of the re-lubrication of a die. The die reduction system as shown in FIGS. 1 through 3 uses standard steel flanges with bolt holes and standard pipes. The bolt holes and bolt studs are not shown for clarity in the drawing figures.

Preferred embodiments of the invention will be disclosed, by way of illustration only, with reference to the following drawings in which:

Referring to FIG. 1 it can be seen that a pressurized liner pipe reduction system 1 is installed in a typical installation. The liner 2 has been pulled through the buried pipeline 3 by the wireline 4 and by the winch 5. Spoolpiece 6, which is approximately ten (10) feet long and with an inside diameter 7 that is substantially larger than the inside diameter of the linepipe 3, will be unbolted and removed by cutting the liner between the flange faces 8. This will leave approximately ten (10) feet of liner exposed. This ten (10) feet of liner will slowly retract part way back into the linepipe 3 as the liner expands against the inside wall of the linepipe 3. The liner material is then placed back against the flange faces to achieve a seal of the liner 2 between the flanges 9. The sealing of the liner material against the flange faces is known to the art. The arrow 10 notes the direction of the liner 2 insertion into the pipeline 3.

Referring to FIG. 2, as a detail of the system 1, illustrating two particularly preferred embodiments of the invention where a pressurized die liner pipe reduction system FIG. 2 comprises (a) a plurality of pressure cells 20, 21, 22 and (b) a plurality of pressurized dies 23, 24, 25 interconnected to provide a continuous system 1. On very short installations between line pipe flanges 53, 54, a pressurized die pipe reduction system 1 comprising one pressure cell 20 and one pressurized die 25 and at least one lip seal 26 located at one end of a pressure cell 20, may be applicable.

Another particularly preferred embodiment of the invention is illustrated FIG. 2 in which the volume of fluid injected into the pressure cells 20, 21, 22 and the pressurized dies 23, 24, 25 is controlled by throttling valves 55 (typical).

The pressure within the pressure cells 20, 21, 22 and pressurized dies 23, 24, 25 is controlled by adjustable back-pressure valves 32 (typical). The excess pressure is vented 35 (typical) to a containment tank not shown, which is known to the art of containment.

The relationship between the available volume and pressure 27 (typical), the throttling valves 55 (typical), and the back-pressure valves 32 (typical) will create a pressure system that will vary the pressure and the volume exerted inside one or a plurality of pressure cells 20, 21, 22 and pressurized dies 23, 24, 25 individually.

Another preferred embodiment of the invention comprises a subject pressure system that will vary the amount of one or more different fluids injected into any of the pressure cells 20, 21, 22 and/or pressurized dies 23, 24, 25.

Another preferred embodiment of the invention involves the economics of building various-sized pressure cells 20, 21, 22 and various-sized pressurized dies 23, 24, 25 at an economical cost. The Pressurized Die liner pipe reduction system 1 is manufactured and assembled by the primary use of, but not limited to, standard commercial flanges 46 (typical) and pipes 56 (typical) made of steel or other metallic or non-metallic products.

Referring to FIG. 3, which illustrates the details of preferred embodiments where a pressurized die 60 that has a pressure injection tube 68 where pressurized liquids 66, controlled by a pressure regulator 63, and a throttle valve 67, are injected under pressure 66 and further are injected under pressure 66 into a recessed area 65, 70 which induces pressure 66 around a liner pipe 69.

As the liner pipe 69 is pulled through the pressurized die 60 at a rate approximately 1 ft./sec., the liquid injected 66 against the pressurized die 60 within the recessed area 70 will re-lubricate the liner pipe 69, further reducing the friction as the liner passes through the pressurized die 60 in a certain direction 71.

Referring to FIG. 3, the liner 69 before reduction 72 has a diameter 74 larger than the inside diameter of the host pipe 76. The liner, after reduction 77 is approximately 92% of the inside diameter of the host pipe and has a diameter 73, which allows the liner 69 to be installed inside the host pipe; later to expand against the inside wall 78 of the host pipe 76.

Referring to FIG. 3, which also illustrates the use of a pressure cell 61 having a diameter 75 to lubricate the liner pipe 69 (also illustrated in FIG. 2) and the pressure within the pressure cell further causes the liner pipe 69 to be in the reduction mode prior to entering the pressurized die 60. The combination of pressure cells 61 (FIG. 2–20, 21, 22) and pressurized dies 60 (FIG. 2–23, 24, 25) held by bolts 62 will substantially reduce the friction and/or drag as a liner pipe passed through the Pressurized Die Invention (FIG. 2) and reduce the overall cost of a typical installation (FIG. 1).

I claim:

1. A liner pipe reduction system comprising:
   a. a first die body having an entry to receive an elastomeric liner pipe to be temporarily reduced in diameter sufficiently to fit within a predetermined inside diameter of a host pipe and an exit to discharge the liner pipe after having it's diameter temporarily reduced, the die body defining an axially oriented frustoconical volume through which the liner pipe travels;

b. a first substantially cylindrical pressure cell at the entry to the die body, the pressure cell arranged to exert fluid pressure on the outside surface of the liner pipe within and traveling through the pressure cell at a pressure less than the elastic limit of the liner pipe to permit the liner to expand to a diameter wherein it is in abutting contact with the inside diameter of the host pipe;

c. a recessed area formed inside the first die body between the entry and the exit; and d. a first source of fluid pressure to pressurize the recessed area in the first die body with a fluid.

2. The liner pipe reduction system of claim 1, further comprising a lip seal within the first pressure cell opposite the entry to the first die body.

3. The liner pipe reduction system of claim 1, further comprising means for varying the pressure of the fluid from first source of fluid pressure.

4. The liner pipe reduction system of claim 1 further comprising means for varying the fluid pressure in the first pressure cell.

5. The liner pipe reduction system of claim 1, further comprising means for varying the flow rate of fluid providing fluid pressure to the recessed area in the first die body.

6. The liner pipe reduction system of claim 1, further comprising means for varying the flow rate of fluid providing fluid pressure to the first pressure cell.

7. The liner pipe reduction system of claim 1, further comprising:

a. a second substantially cylindrical pressure cell at the exit of the die body, the pressure cell arranged to exert fluid pressure on the outside surface of the liner pipe within and traveling through the second pressure cell as it exits the first die body at a pressure less than the elastic limit of the liner pipe;

b. a second die body having an entry in communication with the second pressure cell to receive the liner pipe from the second pressure cell and further having an exit to discharge the liner pipe after having it's diameter reduced, the second die body defining an axially oriented frustoconical volume through which the liner pipe travels;

c. a recessed area formed inside the second die body between the entry and the exit of the second die body; and d. a second source of fluid pressure to pressurize the recessed area of the second die body with a fluid.

8. The liner pipe reduction system of claim 7, further comprising means for varying the fluid pressure in the recessed area of the first die body.

9. The liner pipe reduction system of claim 7, further comprising means for varying the fluid pressure in the second pressure cell.

10. The liner pipe reduction system of claim 7, further comprising means for varying the flow rate of fluid providing fluid pressure to the recessed area in the second die body.

11. The liner pipe reduction system of claim 7, further comprising means for varying the flow rate of fluid providing fluid pressure to the second pressure cell.

12. A liner pipe reduction system comprising:

a. a plurality of die bodies in series, each of the plurality of die bodies having an entry to receive an elastomeric liner pipe to be temporarily reduced in diameter sufficiently to fit within a predetermined inside diameter of a host pipe and an exit to discharge the liner pipe after having it's diameter temporarily reduced, each of the die bodies defining an axially oriented frustoconical volume through which the liner pipe travels;

b. a plurality of substantially cylindrical pressure cells, one each of the plurality of pressure cells at the entry to one of the die bodies, each of the pressure cells arranged to exert fluid pressure on the outside surface of the liner pipe within and traveling through the pressure cell at a pressure less than the elastic limit of the liner pipe to permit the liner to expand to a diameter wherein it is in abutting contact with the inside diameter of the host pipe;

c. a recessed area formed inside each of the plurality of die bodies between the entry and the exit of the die body; and d. a source of fluid pressure coupled to each of the plurality of die bodies to pressurize the recessed area in each of the die bodies with a fluid.

13. The liner pipe reduction system of claim 12, wherein the fluid in each of the plurality of die bodies includes a lubricant.

14. The liner pipe reduction system of claim 12, wherein the fluid in one of the plurality of die bodies comprises water and wherein the fluid in the rest of the plurality of die bodies comprises water with a lubricant.

15. The liner pipe reduction system of claim 12, further comprising a lip seal within one of the plurality of pressure cells.

16. The liner pipe reduction system of claim 12, further comprising means for varying the pressure of the fluid in any die of the system.

17. The liner pipe reduction system of claim 12, further comprising means for varying the pressure of the fluid in any cell of the system.

* * * * *